United States Patent Office 3,478,591
Patented Nov. 18, 1969

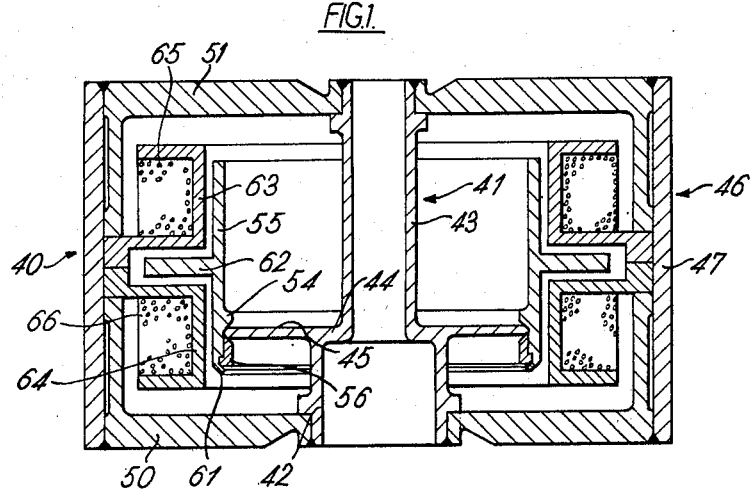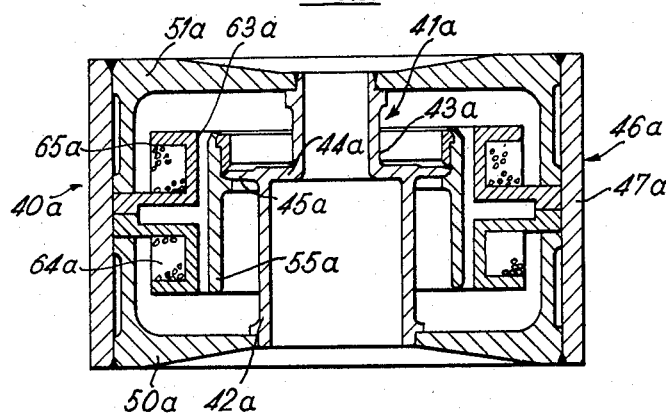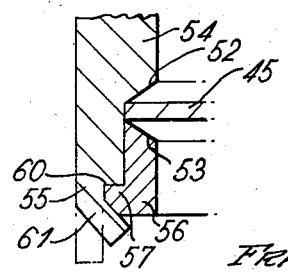

3,478,591
TEMPERATURE SENSING DEVICE
Frank D. Brownhill, Chaddesden, Derby, Michael K. Walker, Wilford, and Peter A. Ward, Derby, England, assignors to Rolls-Royce Limited, Derby, England, a British company
Filed June 21, 1967, Ser. No. 647,691
Claims priority, application Great Britain, Aug. 3, 1966, 34,812/66
Int. Cl. G01k 5/48
U.S. Cl. 73—363                                 9 Claims

ABSTRACT OF THE DISCLOSURE

A temperature sensing device for sensing the temperature of a gas stream comprises a conduit through which the gas stream may flow. The conduit has an external flange operatively connected to a sleeve member which has a flange mounted thereon and arranged between two coils. The position of the flange mounted on the sleeve member with respect to the coils depends on the temperature of the gas, and thus the inductances of the coils also depend on this temperature.

---

This invention concerns a temperature sensing device for sensing the temperature of a gas stream.

According to the present invention there is provided a temperature sensing device comprising a conduit through which a gas stream may flow, two similar electrical components, a sleeve member coaxially mounted about said conduit and operatively connected thereto for varying the position of said sleeve member relative to said electrical components in response to a change in temperature of said conduit, the position of said sleeve member controlling the relative values of said electrical components in dependence upon said temperature, and means responsive to said relative values.

In accordance with one feature of the present invention, however, said electrical components may be a pair of coils coaxially mounted about said conduit with at least a part of said sleeve member disposed between said coils, and said part of said sleeve member may be adapted to effect a change of the relative inductance between said coils upon movement upon said sleeve member. Further, the sleeve member may be mounted inwardly of the coils and outwardly of the conduit.

The conduit may comprise a relatively larger diameter section, a relatively smaller diameter section axially joined to the relatively larger section and a first flange extending from the junction of the larger and the smaller sections and operatively connected to the sleeve member. The temperature sensing device may have in addition a restraining means for restricting the axially joined sections of the conduit on opposite sides of the aforementioned first flange against relative axial movement, the first flange being deflected upon a change in temperature of the conduit thereby altering the position of the sleeve member. In addition, the aforementioned part of said sleeve member may be a second flange extending from the sleeve member between said pair of coils.

In accordance with another feature of the present invention there may be an internal projection extending from said sleeve member, and an annular member mounted within and secured to the sleeve member so as to force the first flange against the internal projection thereby operatively connecting the first flange to the sleeve member. Further, the relatively smaller diameter section of said conduit may be of a greater axial length than the relatively larger diameter section of the conduit. Alternatively, the relatively smaller diameter section of the conduit may be of a shorter axial length than said relatively larger diameter section of said conduit.

The invention illustrated, merely by way of example, in the accompanying drawings, in which:

FIGURE 1 is a cross section through a temperature sensing device according to the present invention, FIGURE 2 shows a portion of the structure of FIGURE 1 on a larger scale, and FIGURE 3 is a view similar to FIGURE 1 but illustrating a modification.

Referring to FIGURES 1 and 2, a temperature sensing device 40 comprises a conduit 41 through which a hot gas stream may flow. The conduit 41 is formed of a ferro-magnetic material which has a relatively high coefficient of expansion, e.g. soft iron.

The conduit 41 has a relatively large diameter portion 42 which forms an inlet portion of the conduit, and a relatively small diameter portion 43, which forms an outlet portion of the conduit. The portions 42, 43 are interconnected at a shoulder 44, the portion 42 being relatively short by comparison with the length of the portion 43.

The conduit 41 is integrally provided with an external annular flange 45 which is located at the junction between the portions 42, 43 and therefore forms an extension of the shoulder 44.

The conduit 41 is mounted within a housing 46. The housing 46 comprises a substantially cylindrical member 47, which is mounted coaxially about the conduit 41, and annular end members 50, 51 which are secured, e.g. by welding, as shown, to opposite ends of the cylindrical member 47. The cylindrical member 47 and the end members 50, 51 are formed of a material such, for example, as "Invar" (registered trademark) having a relatively low coefficient of expansion.

The end members 50, 51 are secured to opposite ends of the conduit 41. Accordingly, if the temperature of the conduit 41 changes, relative axial movement of the opposite ends of the conduit 41 is restricted by the end members 50, 51, and the flange 45 will therefore be bent into a position which will be characteristic of the temperature of the conduit 41.

The flange 45 has chamfered peripheral edges 52, 53, the edge 53 being seated against an internal flange 54 of a soft iron sleeve 55. Mounted within the sleeve 55 is an annular member 56 having an end flange 57 which is seated against a shoulder 60 of the sleeve 55. The sleeve 55 has a reduced diameter end portion 61 which has been peened against the flange 57 to retain the annular member 56 in a position in which it forces the flange 45 against the internal flange 54.

The sleeve 55 has, intermediate its ends, an external flange 62 which is disposed between and spaced from axial spaced annular channel members 63, 64 which are disposed adjacent to and radially outwardly of the sleeve 55, the annular channel members 63, 64 and the sleeve 55 being mounted coaxially about the conduit 41. The annular channel members 63, 64 have open radially outer sides through which electrical coils 65, 66 have been wound thereinto. The coils 65, 66 are coaxially mounted about the conduit 41 and about the sleeve 55, the coils 65, 66 being spaced from and disposed on opposite sides of the flange 62.

The annular channel members 63, 64 are located in position by being clamped between the annular end members 50, 51.

It will thus be appreciated that as the temperature of the conduit 41, changes, so the position of the sleeve 55 and flange 62 changes correspondingly, and this will involve a change in the inductances of the coils 65, 66 in dependence upon the temperature of the conduit 41.

The coils 65, 66 may form adjacent arms of a Maxwell bridge circuit (not shown) whose other arms are provided by coils having equal inductances, the bridge circuit being provided with a meter or other device responsive to the relative values of the inductances of the coils 65, 66. The said device may be calibrated to indicate the temperature of the conduit 41, and thus by inference that of a hot gas stream passing therethrough, and/or it may be arranged to control a part, e.g. a switch, in dependence upon the said temperature, e.g. in dependence upon whether the temperature is above or below a certain value.

It has been found that the sleeve 55 is more effective than the flanges 15 or 62 in varying the relative values of the said inductances, while the form of the annular channel members 63, 64 makes it easier to assemble the coils than does the form of the annular channel members 22, 23.

In FIGURE 3 is shown another embodiment of the present invention which is generally similar to that of FIGURE 1 and which for this reason will not be described in detail, similar parts being given the same reference numerals with the addition of the suffix $a$.

In the FIGURE 3 embodiment, however, the sleeve 55$a$ of the temperature sensing device 40$a$ is not provided with a flange 62 (although it could, of course, be so provided if desired) and is connected to a flange 45$a$ which is connected to the junction between a relatively long portion 42$a$ and a relatively short portion 43$a$ of the conduit 41$a$. The flange 45$a$ may, moreover, have radiused, as opposed to chamfered, peripheral edges.

We claim:
1. A temperature sensing device comprising a conduit through which a gas stream may flow, two similar electrical components, a sleeve member coaxially mounted about said conduit and operatively connected thereto for varying the position of said sleeve member relative to said electrical components in response to a change in temperature of said conduit, the position of said sleeve member controlling the relative values of said electrical components in dependence upon said temperature, and means responsive to said relative values.

2. The temperature sensing device defined in claim 1, wherein said electrical components are a pair of coils coaxially mounted about said conduit with at least a part of said sleeve member disposed between said coils, said part of said sleeve member being adapted to effect a change of the relative inductance between said coils upon movement of said sleeve member.

3. The temperature sensing device defined in claim 2 wherein said sleeve member is mounted inwardly of said coils and outwardly of said conduit.

4. The temperature sensing device defined in claim 1, wherein said conduit comprises a relatively larger diameter section, a relatively smaller diameter section axially joined to said relatively larger section and a first flange extending from the junction of said larger and said smaller sections and operatively connected to said sleeve member, said temperature sensing device comprising in addition a restraining means for restricting said axially joined sections of said conduit on opposite sides of said first flange against relative axial movement, said first flange being deflected upon a change in temperature of said conduit thereby altering the position of said sleeve member.

5. The temperature sensing device defined in claim 4, wherein said electrical components are a pair of coils coaxially mounted about said conduit with at least a part of said sleeve member disposed between said coils, said part of said sleeve member being adapted to effect a change of the relative inductance between said coils upon movement of said sleeve member.

6. The temperature sensing device defined in claim 5, wherein said part of said sleeve member is a second flange extending from said sleeve member between said pair of coils.

7. The temperature sensing device defined in claim 4 having in addition an internal projection from said sleeve member, and an annular member mounted within and secured to said sleeve member so as to force said first flange against said internal projection, thereby operatively connecting said first flange to said sleeve member.

8. The temperature sensing device defined in claim 4, wherein said relatively smaller diameter section of said conduit is of a greater axial length than said relatively larger diameter section of said conduit.

9. The temperature sensing device defined in claim 4, wherein said relatively smaller diameter section of said conduit is of a shorter axial length than said relatively larger diameter section of said conduit.

References Cited

UNITED STATES PATENTS

| | | | |
|---|---|---|---|
| 1,578,112 | 3/1926 | Ernst | 73—363 |
| 1,999,053 | 4/1935 | Kingsland | 236—91 |
| 3,173,067 | 3/1965 | Wright | 335—217 |

LOUIS R. PRINCE, Primary Examiner

WILLIAM A. HENRY II, Assistant Examiner